Oct. 1, 1946.  W. P. MASON  2,408,435
PIPE ANTENNA AND PRISM
Filed March 1, 1941  5 Sheets-Sheet 2

INVENTOR
W. P. MASON
BY
H. O. Wright
ATTORNEY

Oct. 1, 1946.  W. P. MASON  2,408,435
PIPE ANTENNA AND PRISM
Filed March 1, 1941   5 Sheets-Sheet 3

INVENTOR
W. P. MASON
BY
H. O. Wright
ATTORNEY

Oct. 1, 1946.                   W. P. MASON                       2,408,435
                            PIPE ANTENNA AND PRISM
                        Filed March 1, 1941           5 Sheets-Sheet 4

INVENTOR
W. P. MASON
BY
H. O. Wright
ATTORNEY

Oct. 1, 1946.    W. P. MASON    2,408,435
PIPE ANTENNA AND PRISM
Filed March 1, 1941    5 Sheets-Sheet 5

INVENTOR
W. P. MASON
BY
H. O. Wright
ATTORNEY

Patented Oct. 1, 1946

2,408,435

UNITED STATES PATENT OFFICE 2,408,435

PIPE ANTENNA AND PRISM

Warren P. Mason, West Orange, N. J., assignor to Bell Telephone Laboratories, Incorporated, New York, N. Y., a corporation of New York Application March 1, 1941, Serial No. 381,236

12 Claims. (Cl. 250—11)

This invention relates to new and improved methods and means for directionally radiating and absorbing wave energy. More particularly, it relates to wave energy radiating and absorbing methods and means, the latter being generally designated hereinafter as "pipe antennas" and "prisms" wherein the total potentially useful energy is subdivided at the radiating or absorbing means into a large number of components of particular predetermined relative phase. Directive effects are obtained by proportioning the parameters of the system, i. e., the mechanical and/or electrical dimensions in particular manners with respect to the frequency, or frequencies, of the energy to be employed. The recombining of the components produces the desired directive phenomena.

Forms of particular interest for the invention usually include pipes or tubes with a large number of regularly spaced orifices along them. In a more highly specialized form of the invention the pipe or tube is proportioned, and, if necessary, modified, to constitute a multisection wave filter passing a particular predetermined range or band of frequencies. Provision is then made for radiating or absorbing a portion of the total useful energy at corresponding points of each section of the "filter" and advantage is taken of the variation of the phase of the filter throughout its transmitting region to afford directive properties which change with frequency.

At ultra-high frequencies, energy may be conducted through the pipe as a wave-guide. At lower frequencies conducting elements are placed within the pipe to permit appropriate transmission of energy therethrough and in a number of instances auxiliary conducting members having the functions of modifying the impedances and/or increasing the radiation or reception of energy are also employed.

An object of the invention is therefore the provision of novel directive antennas, hereinafter designated "pipe antennas," of extremely simple mechanical construction.

A further object is to provide "pipe antennas" or "prisms" operable over a wide range of frequencies and having highly directive properties which vary as the frequency of the energy employed is varied.

Another object is the provision of highly directive antennas which include as enclosing members, simple perforated pipes.

Additional objects are the provision of systems for assisting in the navigation of mobile craft.

Other objects will become apparent during the course of the following description of preferred illustrative embodiments and in the appended claims.

The principles of the invention will be more readily understood in connection with the accompanyings, in which.

Figure 1:
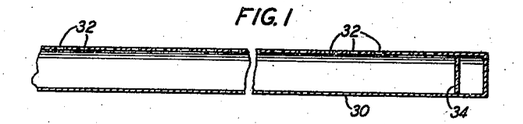
Fig. 1 shows, in longitudinal cross-section, a directive antenna comprising a hollow pipe or wave-guide having a row of regularly spaced orifices along the upper side thereof.

In more detail, the illustrative embodiment of Fig. 1 comprises a directional ultra-high frequency radiator which can be constructed from a simple hollow pipe or wave-guide 30, with a row of regularly spaced holes 32, cut in it along a straight line. The directivity attainable is approximately the same as that for a correctly designed electromagnetic horn of equal length, but since only pipe of uniform and relatively small cross-section is required, the pipe-type radiators are in general simpler, cheaper, and more conveniently constructed and installed. Also as will appear subsequently variable directive characteristics may be readily imparted to the pipe antennas.

In many cases, it will be desirable to design the pipe antenna so that the direction of greatest propagation is along the longitudinal axis of the pipe or at a small angle with respect thereto. As will be demonstrated hereinafter, the angular range within which the major part of the radiation is concentrated is, for a given spacing between holes, inversely proportional to the square of the length used. By varying the sizes of the holes along the length of the pipe to more favorably control the radiation therefrom, as will be explained at greater length hereinunder, secondary lobes can be eliminated to substantially any desired degree.

Figure 2:
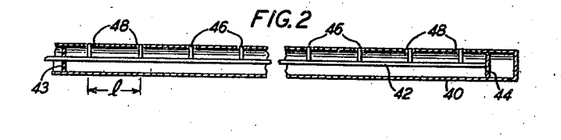
Fig. 2 shows in longitudinal cross-section a directive antenna comprising a coaxial conductor pair having a row of regularly spaced orifices along the upper side thereof and a short laterally projecting conductor affixed to the central conductor and projecting into the opening of each orifice.

It will also be demonstrated that a concentric conductor, such as is illustrated in Fig. 2, comprising outer pipe 40 having a row of holes 48 therein and central conductor 42, terminating in resistance film termination 44 and bearing radiating stubs 46 arranged concentrically in the holes 48, can be employed as a pipe antenna. It will be further be shown that by incorporating shunt sections of line short-circuited on the free ends for use with the concentric conductor type of pipe antenna or by using a wave-guide with the proper ratio of diameter to wave-length, pipe antennas can be made to radiate wave energy of a predetermined frequency at any particular desired angle with respect to the longitudinal axis.

The pipe antenna of this invention is in some respects analogous to the tubular directional microphone described in a paper by R. N. Marshall and applicant, published in the Journal of the Acoustical Society of America, vol. 10, pages 206 to 215 of January 1939. The microphone there described consists of a number of tubes of varying lengths, consecutive ones being an equal increment of length longer than the adjacent ones as shown in Fig. 2 of the paper. It is shown in the above-mentioned paper that a plane wave coming at an angle $\theta$ from the longitudinal axis of the structure will have pressure or voltage response compared to the normal wave of $$\frac{p_\theta}{p_n} = \frac{1}{n} \frac{\sin\left[\frac{n\omega l}{2c}(1-\cos\theta)\right]}{\sin\left[\frac{\omega l}{2c}(1-\cos\theta)\right]} \qquad (1)$$

where $n$ is the number of tubes, $l$ the incremental length, and $c$ the velocity of wave propagation. If we insert short electromagnetic waves in each of the tubes, it is obvious that the same form of device can be made to give a directive electromagnetic wave pattern, as in the acoustic case.

Figure 4A:
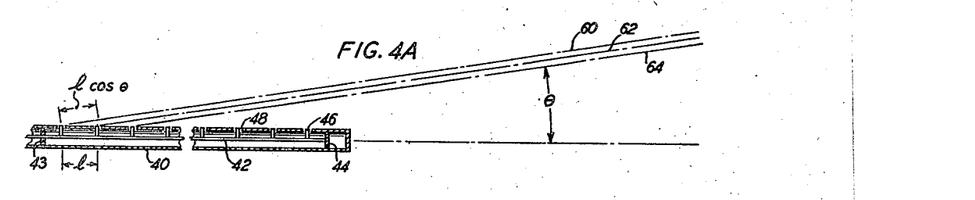
Figs. 4A and 4B are employed in explaining the directional characteristics of antennas of the invention.
Figure 4B:
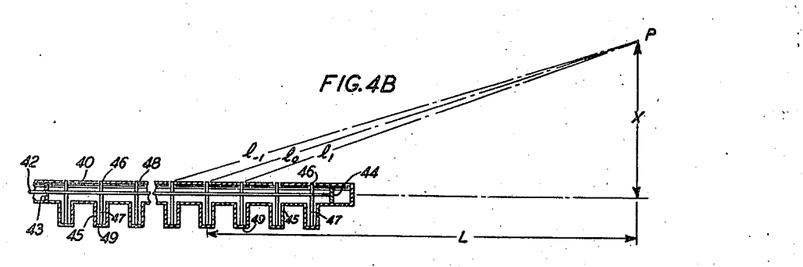

It is more feasible and economical, however, to use the general type various forms of which are illustrated schematically in Figs. 1, 2, 5 and 18 of the accompanying drawings. Antennas of this general type, characterized by the use of an outer member in the form of a single pipe having a row of orifices therein, will be referred to herein as pipe antennas. For such structures, if we start a high frequency wave traveling down a concentric conductor (or a wave-guide) which has a row of small holes bored in the side, the holes being all considerably smaller in diameter than a wave-length, then a small amount of energy is radiated from each hole and the device radiates energy directively in a manner indicated by Figs. 4A and 4B, provided the amount of energy radiated from each hole is approximately the same. A resistance termination substantially matching the impedance of the radiating structure is, preferably, provided at the far end of the structure to absorb the energy which reaches the end of the tube, so that reflections of energy may be disregarded. In order to prove the feasibility of this method of radiating energy, it is necessary to show that each hole will radiate the required amount and that the relative phases of the several amounts of this radiation will be correct.

Figure 3:
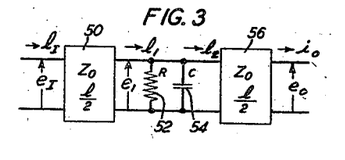
Fig. 3 shows, in diagrammatic form, an electrical circuit employed in explaining the properties of the pipe antennas of the invention.

The radiation resistance of a concentric hole has been investigated by S. A. Schelkunoff, in an article entitled "Some equivalence theorems of electromagnetics and their application to radiation problems," published in the Bell System Technical Journal, January 1936, page 92, who finds it to be approximately $$R = \frac{180}{\pi^2}\left(\frac{\lambda^2 \log \frac{b}{a}}{S}\right)^2 \text{ ohms} \qquad (2)$$

where $\lambda$ is the wave-length in centimeters, $b$ is the inside radius of the outer conductor, $a$ the outside radius of the inner conductor, and $S$ is the area of the opening, i. e., $\pi(b^2-a^2)$. The reactance associated with the hole has not been determined precisely but at low frequencies it will obviously be the fringing capacity between the inner conductor and the outer conductor. As long as the diameter of the hole is considerably less than a wave-length this relation will still hold for higher frequencies. Hence for the conductor of Fig. 2, the effect of the hole will be to shunt the transmission line by a parallel capacitance and resistance as indicated in Fig. 3.

The effect of this on the transmission of a single section of pipe antenna can be obtained by solving the network shown in Fig. 3 which consists of a transmission line 50 or 56 of length $l/2$ and characteristic impedance $Z_0$ on either side of the shunt capacitance 54 and resistance 52, where $l$ is the distance between the centers of two adjacent holes. By lumping the shunting impedances 52 and 54 together as the impedance $Z_s$, and writing out the transmission line equations, in the form shown by Equation 3 of a paper entitled "Filters and Transformers Using Coaxial and Balanced Transmission Lines," by applicant and R. A. Sykes, Bell System Technical Journal, July 1937, page 278, it is readily shown that the relations between the output voltage and current, and input voltage and current, take the form $$e_0 = e_I\left(\cos\frac{\omega l}{c} + i\frac{Z_0}{2Z_S}\sin\frac{\omega l}{c}\right) - iZ_0 i_I\left[\sin\frac{\omega l}{c} + i\frac{Z_0}{Z_S}\sin^2\frac{\omega l}{2c}\right]$$

$$i_0 = i_I\left(\cos\frac{\omega l}{c} + i\frac{Z_0}{2Z_S}\sin\frac{\omega l}{c}\right) - i\frac{e_I}{Z_0}\left[\sin\frac{\omega l}{c} - i\frac{Z_0}{Z_S}\cos^2\frac{\omega l}{2c}\right] \quad (3)$$

where $\omega$ is $2\pi$ times the frequency and $c$ is the velocity of propagation in the tube which is equal to that of radio waves in space provided no intermediate dielectric beads supports for the center conductor are used within the radiating section.

Figure 5:
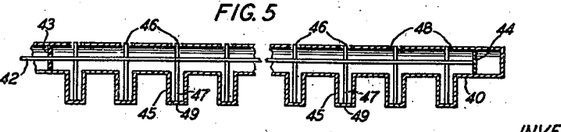
Fig. 5 illustrates a method of modifying the electrical characteristics and of providing more rigid mechanical support for the center conductor of the antenna of Fig. 2.

If intermediate supports for the inside conductor are needed to provide sufficient mechanical rigidity, they are preferably obtained for single frequency or narrow frequency range operation, by using short sections of conductor of an odd number of quarter wave-lengths in length shunted across the radiating conductor at radiating points therealong, the resulting structure being similar to those shown in Figs. 4B and 5 except that where the short sections are employed merely for mechanical rigidity one is not usually needed at each radiating point. These short sections are closed and short-circuited at their free ends and since they will introduce only a very high shunting impedance, their effect can be in many instances entirely neglected.

From Equations 3 and from conventional electrical network theory, we may write the image transfer constant and impedance as $$\cosh\theta = \cosh(A+iB) =$$
$$\cosh A \cos B + i \sinh A \sin B =$$
$$\cos\frac{\omega l}{c} = \frac{Z_0}{2}\left(\frac{1}{X} + \frac{i}{R}\right)\sin\frac{\omega l}{c}$$

and $$Z_I = Z_0 \sqrt{\frac{1 + \frac{Z_0}{2}\left(\frac{1}{X} + \frac{i}{R}\right)\tan\frac{\omega l}{2c}}{1 - \frac{Z_0}{2}\left(\frac{1}{X} + \frac{i}{R}\right)\cot\frac{\omega l}{2c}}} \quad (4)$$

Now if a constant size hole is employed throughout the length of the radiator the characteristic impedance $Z_I$ will be constant and no reflections will take place in the structure. To produce the correct radiation it is only necessary to have a given phase and amplitude for the voltage applied across the radiating hole. The first equation of (4) permits solution for the values of $X$ and $R$ required to give a stated attenuation and phase shift in the tube. Solving, we find $$X = \frac{Z_0}{2}\frac{\sin\frac{\omega l}{c}}{\cosh A \cos B - \cos\frac{\omega l}{c}}$$

and $$R = \frac{Z_0}{2}\frac{\sin\frac{\omega l}{c}}{\sinh A \sin B} \quad (5)$$

Now if we wish to radiate directly along the axis of the pipe, the phase shift inside the pipe has to equal that outside the pipe or $$\cos\frac{\omega l}{c} = \cos B$$

Solving Equations 5 for this case we find $$R = \frac{Z_0}{2\sinh A} \doteq \frac{Z_0}{2A} \quad X = \frac{Z_0}{2}\frac{\tan\frac{\omega l}{c}}{\cosh A - 1} \doteq Z_0\frac{\tan\frac{\omega l}{c}}{A^2} \quad (6)$$

where $A$ is the attenuation per section in napiers which will be a small quantity.

It is readily shown from Equation 1 that if we wish to radiate in only one direction, the holes should be placed closer than half a wave-length of the frequency to be radiated. On the other hand, the nearer to half a wave-length the holes are placed the greater will be the directivity. A useful compromise is to let $$B = \frac{\omega l}{c} = .8\pi$$

for which case tan $$\frac{\omega l}{c} = -.7265$$

We see then from Equation 6 that the shunt reactance for equal phase shift outside and inside should be a very high negative or capacitative reactance. This shunting capacity will be the fringing capacity between the radiating inside electrode and the outside shield or pipe minus the loss of capacity for the inside conductor caused by cutting the hole. While this cannot readily be calculated exactly, the two will usually nearly offset each other so that Equation 6 will be satisfied. If this were not so we would have the anomolous condition of a wave propagation medium with an air dielectric and no attenuation which depends on frequency which had a different velocity of propagation from waves in free space. When this is not found to be true, the excess capacity can be annulled by a shunt indictance at each section as will be discussed hereinunder. The resistance required by Equation 6 can be obtained at high and ultra-high frequencies by adjusting the hole size. An illustrative example of this adjustment is considered hereinafter.

The directivity formula (1) was obtained by calculating the pressures resulting in the termination when a plane wave at an angle with the axis of the tube impinges on the holes. The directivity as a radiator can be calculated by assuming that each hole is a point source of given strength and calculating the resultant field at a distant point at an angle $\theta$ from the axis of the tube. If the point is so distant that all of the lines from the hole to it can be considered as subtsantially parallel, the directivity can be calculated, for example, from the structure of Fig. 4A which represents a pipe antenna of the variety indicated in Fig. 2, parallel rays 60, 62 and 64 being emitted at an angle $\theta$ with respect to the longitudinal axis of the pipe from the first three holes at the left end. The first source or hole will put out a wave $A_1 e^{i\omega t}$ which after traveling a distance D will have the relative value $$A_1 e^{i\omega t} e^{-\frac{i\omega D}{c}} \quad (7)$$

The second hole will have a strength and phase with respect to the first one equal to $A_2 e^{i(\omega t - B)}$, and will arrive at the distant point with a relative strength and phase $$A_2 e^{i(\omega t - B)} e^{-\frac{i\omega}{c}(D - l\cos\theta)} \quad (8)$$

Similar expressions may obviously be derived for the other holes. The sum total of the field at the distant point will then be $$E_\theta = A_1 e^{i\omega\left(t - \frac{D}{c}\right)} + A_2 e^{i(\omega t - B)} e^{-\frac{i\omega}{c}(D - l\cos\theta)} + \ldots$$

$$+ A_n e^{i(\omega t - nB)} e^{-\frac{i\omega}{c}(D - nl\cos\theta)} \quad (9)$$

If the energy radiation from each of the holes is substantially the same, this series is a geometrical progression whose sum is $$E_\theta = A_1 e^{i\omega\left(t - \frac{D}{c}\right)} \frac{\left[1 - e^{-in\left(B - \frac{\omega l}{c}\cos\theta\right)}\right]}{\left[1 - e^{-i\left(B - \frac{\omega l}{c}\cos\theta\right)}\right]} \quad (10)$$

The absolute value of the ratio of this field to the field along the axis (when $\theta = 0$) will then be $$\frac{E_\theta}{E_0} = \frac{1}{n} \frac{\sin n\phi}{\sin \phi} \text{ where } \phi = \left(\frac{B - \frac{\omega l}{c}\cos\theta}{2}\right) \quad (11)$$

If the phase shift inside the pipe or tube 44 is equal to that outside, i. e.

$$\frac{\omega l}{c}$$

this relation reduces to Equation 1.

Figure 6:
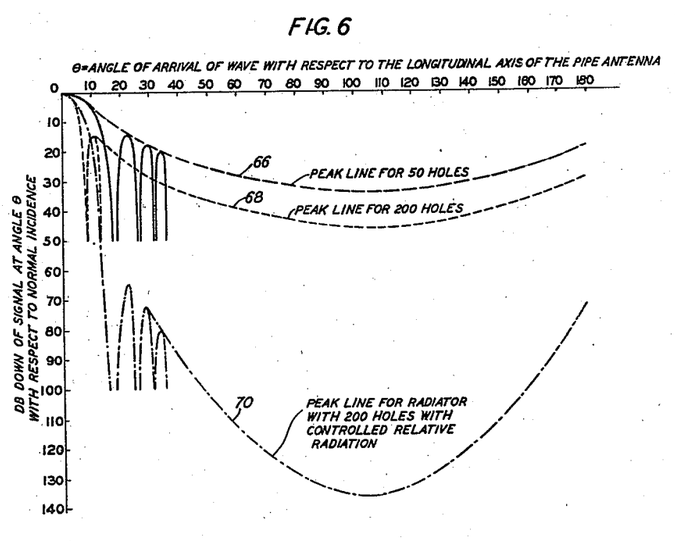
Fig. 6 comprises three curves illustrating response versus angle of approach for several pipe antennas of the invention.

A plot of Equation 1 when $$B = \frac{\omega l}{c} = .8\pi$$

and $n$ is 50 is shown in Fig. 6, curve 66. Practically all of the energy is confined in a cone 10 degrees from the longitudinal axis. For a wavelength of 10 centimeters this would require a pipe 2 meters or 6 feet long. If we make the number $n = 200$ and use a tube 8 meters (or 24 feet) long, practically all the energy will be confined in a cone of angle 5 degrees. The angle of the cone, for small angles, becomes inversely as the square of the length. To confine the radiation within a 2.5 degree angle would require a 100-foot pipe antenna.

We have calculated the radiation on the assumption that all holes radiate equally. Actually, if we keep the hole size constant down the length of the tube, the radiation from each hole will decrease in strength by a factor $e^{-A}$, where $A$ is the attenuation in napiers between each hole. The effect of this modification is readily taken account of in Equation 9 and the result is $$\frac{E_\theta}{E_0} = \sqrt{\left(\frac{\cosh A - 1}{\cosh nA - 1}\right)\left(\frac{\cosh nA - \cos 2n\phi}{\cosh A - \cos 2\phi}\right)} \quad (12)$$

Figure 7:
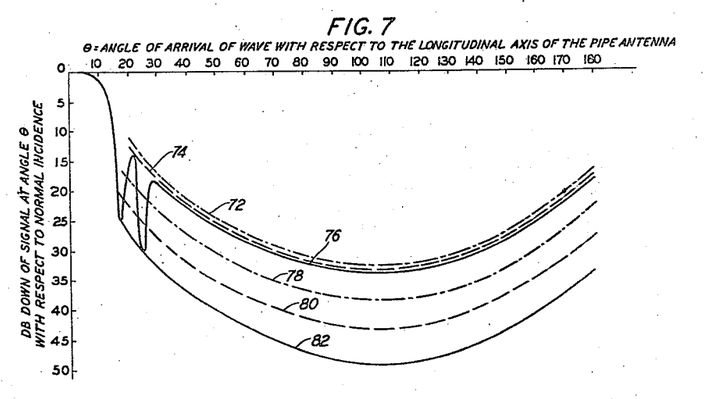
Fig. 7 comprises six curves illustrating response versus angle of approach for a number of pipe antennas of the invention and for various percentages of power radiated.

A plot of this equation is shown in Fig. 7 assuming a fifty-hole tube for the conditions 50 per cent, 75 per cent and 90 per cent of the input energy radiated by the pipe, curves 82, 80 and 78, respectively. As can be seen, the main effect on the characteristic is to decrease the separation between the low points and the high points. A slight loss of discrimination against the secondary peaks is also experienced, amounting to .1 decibel for 50 per cent power radiation, .5 decibel for 75 per cent and 1.4 decibels for 90 per cent power radiation. It appears desirable, therefore, to keep the radiation at substantially 75 per cent of the input power.

All of the directional characteristics shown have secondary lobes the nearest of which is about 14 decibels down from the fundamental. For some purposes this may be undesirable. It has been shown in Patent 2,225,312, issued to applicant on December 17, 1940, that for a plurality of radiators, if we vary the amount of radiation from radiator to radiator, the secondary lobes can be reduced at the expense of a slight amount of sharpness for the fundamental lobe. If, for example, we have $n$ radiators all different in phase by equal steps, and arrange the amount of radiation from them according to the series $$E = e^{i\omega\left(t - \frac{D}{c}\right)} \left[1 + 2e^{-i\left(B - \frac{\omega l}{c}\cos\theta\right)} + \ldots + \frac{n}{2} e^{-\frac{in}{2}\left(B - \frac{\omega l}{c}\cos\theta\right)} + \left(\frac{n}{2} - 1\right) e^{-i\left(\frac{n}{2} + 1\right)\left(B - \frac{\omega l}{c}\cos\theta\right)} + \ldots + e^{-in\left(B - \frac{\omega l}{c}\cos\theta\right)}\right] \quad (13)$$

this will be recognized as the square of a series with equal radiation from half the number of holes. The absolute value of the summation will be $$\frac{E_\theta}{E_0} = \left(\frac{2}{n}\right)^2 \left[\frac{\sin \frac{n}{2}\phi}{\sin \phi}\right]^2 \quad (14)$$

The result would be to make the first secondary lobe down about 27 decibels with respect to the primary lobe. If we carried the process farther and made the successive strength of the radiation from the holes vary according to the fourth power equation $$E = e^{i\omega\left(t - \frac{D}{c}\right)} \left[1 + e^{-i\left(B - \frac{\omega l}{c}\cos\theta\right)} + \ldots + e^{-i\left(\frac{n}{4}\right)\left(B - \frac{\omega l}{c}\cos\theta\right)}\right]^4 \quad (15)$$

the effect would be to reduce the secondary lobes with respect to the primary one by four times the number of decibels. Fig. 6, curve 70, shows the effect of a 200-hole radiator on this basis as compared to a 200-hole radiator on the equal power basis, Fig. 6, curve 68. The primary lobe is not quite as sharp but the secondary lobes are greatly reduced.

This process could be applied exactly to the type of radiator discussed here by varying the sizes of the radiating holes provided we placed resistances in parallel to make each total resistance the same. Then the characteristic impedance would be the same for all sections of the equivalent network of the antenna, no reflections would occur, and the successive radiation strengths would be in the required ratio. This process is objectionable, however, on the grounds of complexity and loss of radiated power. It can be applied, however, with substantial exactitude and without objectionable complexity for it can be shown that the effect of the reflections is to change the phases of the voltages applied to the radiating resistances by small and progressive amounts so that the directivity is not substantially impaired. From Equation 4 since $X$ is very large and the ratio $Z_0/2R$ is very small, the characteristic impedance of a section becomes $$Z_1 = Z_0 \sqrt{\frac{1 + j\frac{Z_0}{2R}\tan\frac{\omega l}{2c}}{1 - j\frac{Z_0}{2R}\cot\frac{\omega l}{2c}}} \doteq$$

$$Z_0 \left[1 + j\frac{Z_0}{2R\sin\frac{\omega l}{c}}\right] \doteq Z_0(1 + jA_m)$$

where $A_m$ is the attenuation caused by the $m$th hole, since $$\sin\frac{\omega l}{c}$$

will be nearly unity.

Suppose that we arrange the resistance values in such a way that $$\frac{Z_0}{2R_1}=A_1;\ \frac{Z_0}{2R_2}=2A_1;\ \ldots\ \frac{Z_0}{2R_{(n/2)}}=\frac{n}{2}A_1;$$

$$\frac{Z_0}{2R_{\left(\frac{n}{2}+1\right)}}=\left(\frac{n}{2}-1\right)A_1;\ \ldots\ \frac{Z_0}{2R_n}=A_1 \quad (17)$$

where $n$ is the total number of radiating holes. The total attenuation down the tube, will be the sum of the individual attenuations or $$A=\frac{n}{2}\left(\frac{n}{2}+1\right)A_1 \quad (18)$$

If we radiate three-fourths of the power $A=.691$ napier. For a 50-hole radiator, $A_1$ will be .00106. Since there is a change in the characteristic impedance in going from one section to the next, there will be a first order current reflection equal for the $m$th hole ($m<n/2$) to $$\frac{Z_0[1+jmA_1]-Z_0[1+j(m+1)A_1]}{Z_0[1+jmA_1]+Z_0[1+j(m+1)A_1]}\doteq-\frac{jA_1}{2} \quad (19)$$

When $m>n/2$ the sign of the reflected current will be reversed. The phases of the reflected currents will be disturbed randomly with respect to each other, so that the sum total of all the currents will not add up to more than several times that of any single reflection. Hence the reflected current will be only in the order of $1/1000$ of the transmitted current and hence will not affect the strength or phase of the original radiation sufficiently to produce any measurable change.

Another radiation characteristic of some interest is one in which the maximum radiation occurs at an angle $\theta$ from the axis of the tube. This can easily be obtained with the device by making the phase shift inside the tube somewhat smaller for the same frequency than it is outside the tube. From Equation 10 or 11 we readily see that if $$B=\frac{\omega l}{c}\cos\theta_0 \quad (20)$$

the maximum reception will occur at the angle $\theta$. The directivity pattern will be the same as shown in Fig. 6 with $\theta_0$ taken as the zero angle. In order to get the phase shift $B$ smaller than $$\frac{\omega l}{c}$$

it is necessary to shunt the section with positive reaction as shown by Equation 5 which gives the value necessary for a given value of B. As shown by Fig. 5, this can be done by putting on shunting short-circuited sections of line 45 of the proper length and impedance to give the reactance X desired. This, in effect, makes a high-pass filter out of the transmission line.

The same effect can be obtained more easily and effectively, particularly at high and ultra-high frequencies, by using a wave-guide of the proper ratio of diameter to wave-length to produce the desired phase shift. This follows from the fact that the wave-guide is inherently a high-pass wave filter and by choosing the ratio of diameter to wave-length of the correct value, the phase shift inside can be made any desired ratio to that outside. Other effects obtainable with radiators having wave-filter structure incorporated therein will be described hereinafter.

An airplane landing beacon using ultra-short waves and electromagnetic horns was described in a paper by W. L. Barrow in the Journal of the Institute of Radio Engineers, January 1939, page 41. This landing system consisted of two electromagnetic horn radiators to produce two beams making an angle $\theta_1$ and $\theta_2$ from the ground. The two beams have the same carrier frequency but slightly different signal frequencies. An airplane coming down at an angle $$\frac{\theta_1+\theta_2}{2}$$

hears equal strength from both beams and hence is able to control its landing angle. The difficulty with the system is that in order to obtain a narrow enough beam, even for a 10-centimeter wave, the length of the two horns becomes excessive, and since they are above ground they are likely to cause damage or to be damaged when the airplane lands.

Figure 8:
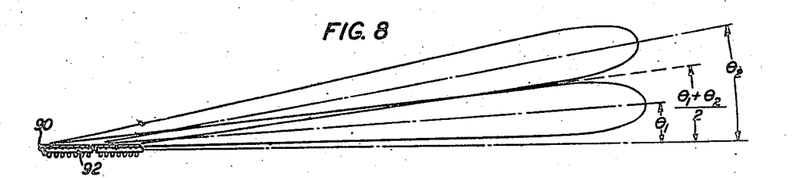
Fig. 8 shows two pipe antennas of the invention arranged to radiate a pair of lobes directed at slightly different vertical angles in a common plane to provide an inclined median line of equal energies from the two antennas for use in landing aircraft.

The pipe type radiators of this invention can be arranged in such a landing system so as to eliminate these difficulties. For example, in Fig. 8 are shown schematically two long pipe radiators 90 and 92, similar to that shown in Fig. 5, placed flat on the ground (they may be set in concrete for protection), one of which is proportioned to radiate at an angle $\theta_1$, and the other at an angle $\theta_2$. This can, of course, be accomplished as explained above.

Since the best airplane landing angle is about 2.5 degrees, it appears that one radiator should radiate at an angle of $\theta_1=0$ or directly along the ground, while the other one should radiate at about $\theta_2=5$ degrees. In order to concentrate most of the beam in a 2.5 degree angle it requires, as above explained, a pipe radiator with 800 holes, 100 feet long, assuming a 10-centimeter wave is used.

For any other wave-length, the size would be in proportion to the wave-length. The 5 degree angle beam can be obtained either by using shunt short-circuited sections of line as in the structure of Fig. 5, or alternatively, a wave-guide of the correct ratio of outside diameter to wave-length as in the structure of Fig. 1 may be used.

Figures 9, 10, 11, 12, 13:
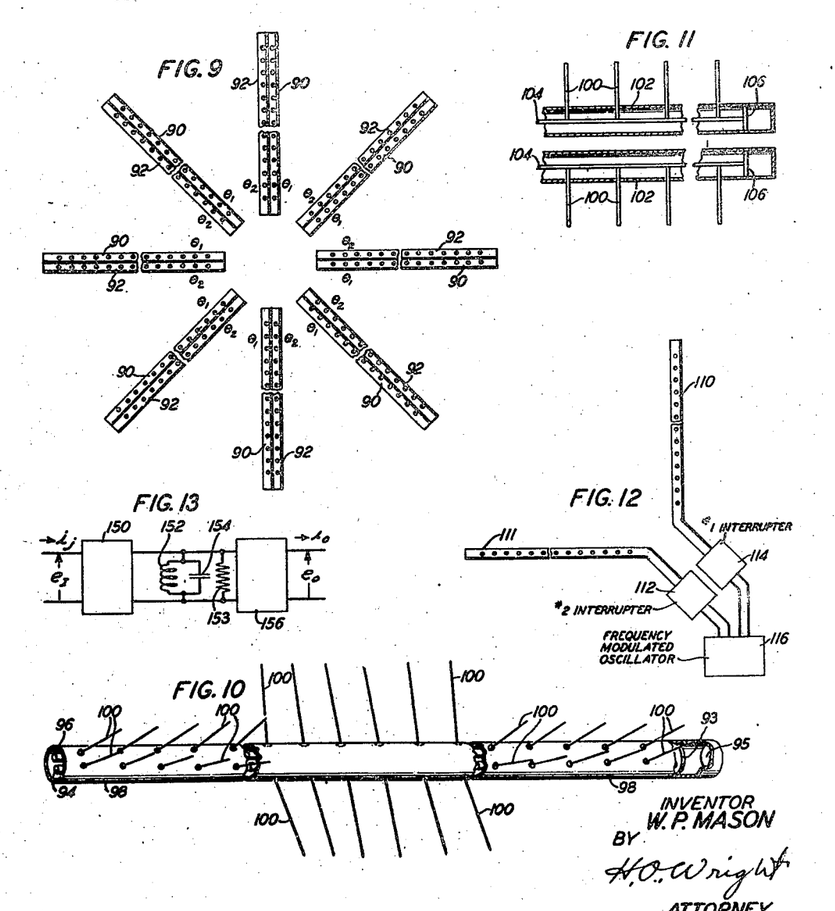
Fig. 9 shows eight pairs of pipe antennas, arranged radially from a common center, each pair being designed as for the pair shown in Fig. 8, to provide inclined, guiding median energy lines for aircraft, approaching from any azimuth angle.
Figs. 10 and 11 show hybrid antennas combining features of the "pipe antenna" with features of prior art dipole antenna arrays.
Fig. 12 illustrates a further use of pipe antennas in a system for guiding aircraft.
Fig. 13 shows in diagrammatic form an electrical circuit employed in explaining certain features of the antennas of the invention.

If it is desired to send these beams out in a large number of directions, so that an airplane can land from substantially any direction, a circular arrangement of a number of these paired pipes, in parallel, can be used as, for example, is indicated in Fig. 9.

On the other hand, if two-plane beams are desired, it is necessary to electrically connect a number of these radiators, placed in parallel positions, together, arranged so that they are an integral number of electrical wave-lengths apart. Since in all such arrangements all the radiators can be placed parallel to the earth, they can be imbedded in concrete and the aircraft can land on them without injury to the radiating system or to the aircraft.

By way of example, an approximate calculation of the constants of one of these radiators is given below for a 10-centimeter wave-length. Assuming that all of the holes are to be equal radiators, and that the radiator radiates three-fourths of the power, the ratio of the radiation resistance to the characteristic impedance of the pipe antenna must be $$R = 578 Z_0 \quad (21)$$

If $Z_0$ is taken as 80 ohms, in order to obtain an optimum line, we find $$\frac{\log_e \left(\frac{b}{a}\right)}{b^2 - a^2} = 1.59 \quad (22)$$

where $b$ is the radius of the hole and $a$ is the radius of the stub conductor centered in the hole. This is satisfied by quite a range of ratios $$\frac{b}{a}$$

for example by $b=1$ centimeter; $a=.22$ centimeter.

On the other hand, if it is desired to eliminate some of the secondary lobes, by having the successive radiation resistances vary according to Equation 17 the lowest resistance which corresponds to $R_{(n/2)}$, will be half the value shown by Equation 21. This is satisfied by making $b=1$ centimeter; $a=.3845$ centimeter. The highest resistance will be 400 times this value. This can be met by letting $b=.25$ centimeter; $a=.069$ centimeter so that the entire range can be met with practicable values.

A smaller range of hole sizes would result if the inside stub conductors were not brought out to the outside shield but only extended part way to it. In this case the field outside would be considerably less and hence the radiation resistance would be much higher. If this method were employed it would be possible in many instances to let the hole size remain constant for the whole length of the antenna.

In order to get the second radiator to radiate at an angle of 5 degrees it is necessary to shunt a positive reactance $+j57.5Z_0$ across each radiating hole. If the shunt line has the same characteristic impedance as the main conducting tube, this requires a short-circuited line whose phase angle is 89 degrees at the radiating frequency, since the impedance of a short-circuited line is $$+jZ_0 \tan\left(\frac{\omega l}{V}\right)$$

and the value of the tangent will be 57.5 when $$\left(\frac{\omega l}{V}\right)$$

corresponds to a phase shift of 89 degrees.

The only quantity not determined is the diameter of the transmission tube. In order to make the power radiated large compared to that lost in transmission we should make the tube diameter large. On the other hand, if it is made too large some of the more complicated wave shapes of the wave-guide will be transmitted which may, in some instances, be objectionable. If the inside diameter of the outer tube is taken as 5 centimeters, or nearly 2 inches, nothing but plane waves will be transmitted and the attenuation down the 100-foot pipe at 10 centimeters will be .7 decibel and for the case considered here 70 per cent of the power input will still be radiated.

In many instances it will be found that a simple pipe-type electromagnetic radiator with holes for radiating surfaces will not be satisfactory for use with wave-lengths substantially longer than 10 centimeters, because the radiation resistance of the holes will be found to be objectionably high.

For longer wave-lengths, however, it is easily possible to employ analogous radiating structures which inherently provide more radiation and hence have lower radiation resistance. Fig. 10 shows one such arrangement which consists of balanced and shielded transmission lines having conductors 94 and 96 and shield 98 with half-wave or shorter pairs of radiating conductors 100 connected at regular intervals along the two conductors 94 and 96, respectively, and extending through shield 98. The conductors 94 and 96 are insulated from each other and from the shield 98 and the radiating conductors 100 each connect to one of the conductors 94 or 96 only and extend through holes in shield 98 without making contact therewith. Since the radiating pairs or doublets can be made half-wave radiators they can be proportioned to introduce low resistances and substantially no reactance in shunt with the line.

By making the angle between the two members of such a doublet small, the radiation resistance can be made large, while if the angle between the members of the doublet is made 180 degrees, the resistance will be minimum.

Thus by gradually changing the angle between the members of successive pairs of radiating members, as indicated in Fig. 10, where the radiating members of the several pairs are substantially parallel at the ends of the structure and substantially 180 degrees from each other at the center thereof, secondary lobes may be substantially reduced in magnitude relative to the main lobe.

The effect, is of course, analogous to that described above for the case of simple perforated pipe-type radiators where it was demonstrated that minor lobes can be suppressed by tapering the size, and consequently the radiation resistance, of the successive radiating holes along the pipe in accordance with relations such as are set forth in Equations 13 and 15 above. As for the simple pipe radiators, the far end of the transmission line should be terminated in a resistance 93 which substantially matches its impedance. By using combinations of this type the principles described above for pipe antennas can be applied for use with systems operating at much longer wave-lengths.

A similar arrangement is shown in Fig. 11 and comprises two concentric lines having outer conductors 102, inner conductors 104 and resistive terminations 106, the radiating elements 100 being connected at regular intervals along each of the two inner conductors 104 and extending through holes in the outer conductors 102 as shown. The radiating elements can be paired and proportioned as half-wave doublet radiators. Obviously the angles between successive pairs of radiators may be varied as illustrated for the structure of Fig. 10, if desired. The particular advantages of these arrangements will be described in detail hereinunder.

Such arrangements radiate in only one direction and can be combined as units in more complicated antenna arrays, such as the well-known MUSA systems.

Viewed more broadly, the wave-filter pipe antennas of this invention may be considered to be a new form of prism. They are, of course, applicable to electromagnetic waves, to sound and su-peraudible acoustic waves and even to heat or any other type of radiant energy. Calculations are given below to illustrate this broader view and to demonstrate the angle sensitivity and angle change as a function of the dimensions of the radiating structure and the frequency of the radiant energy.

For wave-lengths in the neighborhood of 10 centimeters, and for shorter wave-lengths, the electromagnetic prism consists, in one form (the essential mechanical features of which when appropriately proportioned are similar to those for the radiator illustrated by Fig. 5) of a concentric line with short-circuited sections of a similar line spaced at less than half a wave-length of the anti-resonant frequency of the latter sections and connected as shunt circuits across the first-mentioned concentric line. In "parallel with" the shunt sections are small holes for radiating from each hole a portion of the energy of the electromagnetic waves, being transmitted along the first-mentioned line, into the surrounding region. The construction and calculations are very similar to those given above where we were considering the structure simply as a single-frequency pipe-type directional electromagnetic radiator. The shunting, short-circuited sections connected across the main conducting line are in this instance, however, proportioned in accordance with principles well known in the art, for example see the above-mentioned paper by applicant and R. A. Sykes, to constitute an electromagnetic wave filter.

As will appear presently, in the majority of applications this wave filter is preferably of the band-pass (rather than the high-pass) type and the filter so constituted should have as many sections as there are shunting elements.

In a band-pass wave filter, including those of the above indicated type, the lower cut-off frequency is somewhat below the anti-resonant frequency of the shunting sections of line as is at once apparent from elementary wave filter theory, since the shunt arms of a band-pass wave filter are anti-resonant at the mid-frequency of the band. Similarly, the upper cut-off frequency is somewhat above the above-mentioned anti-resonant frequency.

At the lower cut-off frequency the phase shift between adjacent sections is zero so that the energy radiated from all of the holes will be in phase. Consequently, a narrow radiated beam will be sent out in a plane which is perpendicular to the axis of the antenna. As the frequency is raised, there will be a phase difference $\varphi$ between energy emanating from successive radiating holes. If $$\frac{\omega l}{V}$$

is the phase shift in the surrounding air between succeeding holes, the angle of radiation from the axis of the pipe along the direction of propagation, is given by $$\cos \theta = \frac{\varphi}{\frac{\omega l}{V}} \text{ if } \varphi < 180 \quad (31)$$

and $$\cos \theta = \frac{(\varphi - 360°)}{\frac{\omega l}{V}} \text{ if } \varphi > 180 \quad (32)$$

When the phase shift in the filter is the same as the phase shift between the radiating holes in the surrounding space, which occurs when the frequency is the anti-resonant frequency, or mid-band frequency $f_M$, the radiation occurs directly along the axis of the tube.

If the phase shift between holes at this frequency is 180 degrees, which is the most advantageous condition, the radiation will also occur directly along the tube in the reverse direction at this frequency, as shown by Equation 31.

As the frequency is further increased, all of the radiation will be directed toward the generator at an angle $\theta$ from the axis which increases with increasing frequency, till at the upper cut-off the radiation is again perpendicular to the axis of the tube.

The frequency band over which these changes occur can be regulated by regulating the width of the transmission band of the wave-filter pipe system.

If it is desired to keep this range small, the shunting elements should have a low impedance for then the band widths are small. These relations are discussed hereinafter.

Such a device constitutes a good marker beacon for use in aircraft navigation since a plane at some distance from the beacon will receive a certain frequency the value of which is indicative of its angular direction from the beacon. By flying a course which causes the received frequency to increase most rapidly, the plane will pass over the beacon. A still better beacon from which more information can be obtained is the combination of two such devices at right angles to each other in a horizontal plane, as indicated in Fig. 12. The devices can be two identical radiators 110 and 111 with the applied frequencies generated in the wide band frequency oscillator 116 modulated at different rates by modulators 112 and 114 so that the signals from the two beacons can be readily distinguished, or, alternatively, they can be proportioned to operate in different frequency ranges, the single oscillator sweeping the combined ranges of the two radiators. Numerous other similar arrangements of this character will readily occur to those skilled in the art.

In the system of Fig. 12, since the aircraft pilot can tell the angle of the craft from the positive direction of both radiators, he can locate its absolute angle and approximate position with respect to the beacon. If, in addition, the altitude is known from barometric pressure or an altimeter, the distance and position with respect to the earth and the beacon can be completely determined.

Such a system of cross radiators can also be used to produce a glide path landing beam. When the plane receives equal frequencies from the two radiators, assuming identical radiators are being used, it is on a path running through the center of the beacon at an angle of 45 degrees with respect to each of the radiators. If the frequencies are below the mid-band frequency of radiation, it will be approaching in the positive direction, whereas if the frequencies are above the mid-band it will be approaching in the negative direction. If the frequencies correspond to the 45-degree radiation, the glide path will be directly along the ground, while if the frequencies correspond to a radiation angle of $\alpha$ given by Equation 33, below, the glide path will be at an angle of $\alpha$ with respect to the ground.

$$\cos \alpha = \frac{\cos 45°}{\sqrt{1 + \sin^2 \theta}} \quad (33)$$

In order to make the system more sensitive to the landing angle $\theta$, the landing radiators can be tipped with respect to the horizontal. This can be done by mounting the radiators on a tilting platform of light weight which will preferably swing down to a level position in the event that the airplane lands on it.

In instances where wave-lengths considerably longer than 10 centimeters are to be used, the radiation resistance of the holes per se is, as stated above, too large to permit the radiations of the required amount of energy from each. In such instances the constructions of the general type illustrated by Figs. 10 and 11 and described above, can conveniently be used.

For the glide path beacons discussed above the balanced construction of Fig. 11 is preferably used so that horizontal or vertical doublets can be used to radiate the energy. By reducing the over-all dimensions of the doublet pairs, the resistance of each pair can be reduced until the desired resistance is obtained. The reactances introduced, which will be capacitative if the doublets are less than half a wave-length, can be incorporated with short-circuited line sections, added in shunt in the same manner as for the structure of Fig. 5, to produce an anti-resonance at the correct frequency.

The same fundamental principles can be readily applied in the construction of acoustic prisms for use in filters, in frequency division systems, and such systems as those employed for the acoustic viewing of obstacles, etc., through sea water. Prisms constructed in accordance with the principles of this invention will in general have advantages over the prisms of the prior art in that the frequency ranges of radiation can be adjusted by adjusting the dimensions, the losses in the transmission ranges are considerably smaller, and a greater angle of sweep can be obtained when desired, with a given frequency change.

Figure 15:
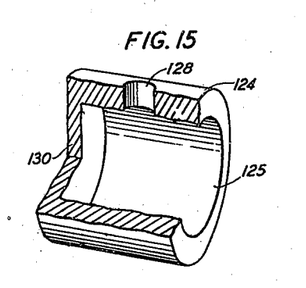
Figs. 15 to 17, inclusive, illustrate the elements and equivalent electrical circuit of an acoustic antenna designed to employ the principles of the invention.
Figure 16:
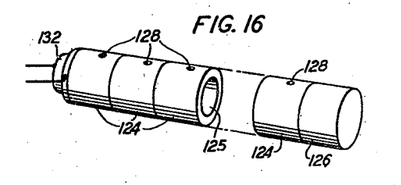

A simple structure for one form of acoustic or compressional wave-energy prism of the invention is indicated in Figs. 15 and 16. The specific form of prism illustrated by Figs. 15 and 16 consists of a pipe with transverse diaphragms and intermediate orifices regularly spaced therealong. As a matter of convenience in manufacture the pipe may be an assembly of a series of cup-shaped members 124, a single cup being shown in detail in Fig. 15 with a portion broken away to expose the interior. A number of the cups (at least twenty-five should be used for the majority of applications) are arranged coaxially in a row as shown in Fig. 16 with the bottom of one cup firmly pressed against the top or rim of the adjacent cup.

Any convenient external clamping means which does not interfere with the driving mechanism or with radiation from the orifices may be employed to clamp the cups in a row as indicated. Since any mechanic can, obviously, readily devise a suitable clamping means none has been shown in Fig. 16 as it would unnecessarily complicate the drawings.

Each cup is provided with an orifice 128 to permit the radiation of an appropriate amount of energy and a piezo-electric crystal or similar type of driving element 132 is pressed against the input end of the acoustic transmission line so formed. At the far end a member 126, designed in accordance with principles well known in the art to absorb any residual sound energy reaching it, is provided. The thin part or bottom 130 of the cup 124 vibrates in the manner of a circular plate, or diaphragm, in flexure clamped around its periphery, when a difference of pressure occurs on the two sides.

Figure 17:
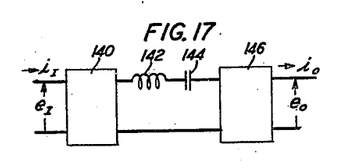

The equivalent circuit of the structure is as shown on Fig. 17. The series resonant circuit 142, 144 represents the reaction of the clamped diaphragm, while the transmission lines 140, 146 represent the propagation of the acoustic wave in the cup cavities. The combination can, obviously, readily be proportioned to be a band-pass filter, the dimensions and width of the pass-band of which can be adjusted and controlled by making the diaphragm thicker or thinner, as discussed hereinafter. By providing small holes or orifices 128, Figs. 15 and 16, in each section of the filter so formed, a specified amount of energy can be radiated from each of the sections, and the operation will, obviously, be similar to the electromagnetic prisms described above. The energy which gets through the last filter section is absorbed by a terminating resistance or energy absorbing member 126, as is also recommended for the electromagnetic prisms, in order that substantially no reflections from the far end will occur.

In the acoustic case, it is frequently desirable to employ the device for submarine detection, the location of submerged objects and for similar purposes. For such purposes the prism may be immersed in the water and the cups are then permitted to fill with water. By way of example, for a prism to be employed submerged in sea water and to operate over a band of frequencies centered about the frequency of 55 kilocycles each cup should have an internal radius of .54 centimeter, an over-all length of 1.204 centimeters and a diaphragm .109 centimeter thick. The side walls of the cup should be at least .25 centimeter thick. These dimensions assume that the material of which the cup is made is brass. The orifice should be centrally located with respect to the cavity and should be about .25 centimeter in diameter. Such a structure will have a band width of 22,000 cycles.

The equivalent circuit of the pipe-type electromagnetic prism illustrated by Fig. 5 when proportioned to have band-pass filter properties is that shown in Fig. 13. Inductance 152, resistance 153 and capacity 154 represent the shunting impedance including the stub lines 49 of Fig. 5 and 150 and 156 represent lengths of the concentric line between shunting points. The equations for this circuit are $$e_0 = e_I\left[\cos\frac{\omega l}{V} + j\frac{Z_0}{2Z_s}\sin\frac{\omega l}{V}\right] - jZ_0 i_I\left[\sin\frac{\omega l}{V} + j\frac{Z_0}{Z_s}\sin^2\frac{\omega l}{2V}\right] \quad (34)$$

$$i_0 = i_I\left[\cos\frac{\omega l}{V} + j\frac{Z_0}{2Z_s}\sin\frac{\omega l}{V}\right] - j\frac{e_I}{Z_0}\left[\sin\frac{\omega l}{V} - \frac{Z_0}{Z_s}\cos^2\frac{\omega l}{2V}\right] \quad (35)$$

where $Z_s$ is the total shunting impedance between lines, i. e. the combined impedance of elements 152, 153 and 154, Fig. 13, $Z_0$ and $V$ are the characteristic impedance and velocity of propagation of the coaxial conductor, respectively, and $l$ is the distance between shunting points. From these equations, the propagation constant and the characteristic impedance can be written as $$\cosh P = \cosh(A + jB) =$$
$$\cosh A \cos B + j \sinh A \sin B = \cos\frac{\omega l}{V} +$$
$$\frac{jZ_0}{2Z_s}\sin\frac{\omega l}{V} \quad (36)$$

$$Z_I = Z_0 \sqrt{\frac{\sin\frac{\omega l}{V} + j\frac{Z_0}{Z_s}\sin^2\frac{\omega l}{2V}}{\sin\frac{\omega l}{V} - j\frac{Z_0}{Z_s}\cos^2\frac{\omega l}{2V}}} \quad (37)$$

The shunting impedance in this case will consist of the short-circuited line shunted by the high radiation resistance R (153 of Fig. 13), so that $$Z_s = \frac{jZ_{01}R\tan\frac{\omega l_1}{V}}{R + jZ_{01}\tan\frac{\omega l_1}{V}} \quad (38)$$

where $Z_{01}$ and $l_1$ are the characteristic impedance and effective length of the short-circuited line. Inserting these values we have $$\cosh A \cos B = \cos\frac{\omega l}{V} + \frac{Z_0}{2Z_{01}}\frac{\sin\frac{\omega l}{V}}{\tan\frac{\omega l_1}{V}} = C \quad (39)$$

$$\sinh A \sin B = \frac{Z_0}{2R}\sin\frac{\omega l}{V} = D \quad (40)$$

If we neglect the radiation resistance R, the lower and upper cut-off frequencies are given by solving the equation $$\tan\frac{\omega l}{2V}\tan\frac{\omega l_1}{V} = \frac{Z_0}{Z_{01}} \quad (41)$$

$$\cot\frac{\omega l}{2V}\tan\frac{\omega l_1}{V} = -\frac{Z_0}{Z_{01}} \quad (42)$$

If, for example, we let $$\frac{\omega l}{V} = \frac{2\omega l_1}{V}$$

which represents a most useful case because it gives a symmetrical frequency angle curve, the lower and upper cut-offs are, respectively, $$f_1 = \frac{V}{\pi l}\tan^{-1}\sqrt{\frac{Z_0}{Z_{01}}} \quad (43)$$

$$f_2 = \frac{V}{\pi l}\tan^{-1}\left(-\sqrt{\frac{Z_0}{Z_{01}}}\right) \quad (44)$$

Figure 19:
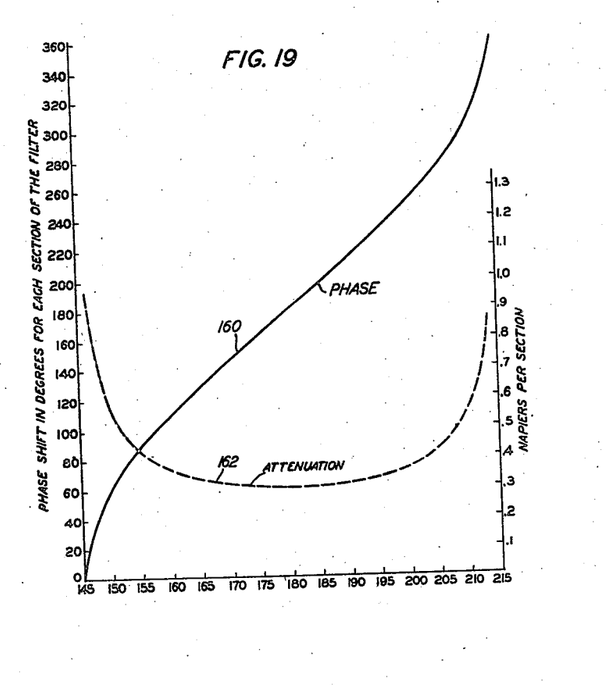
Fig. 19 shows curves of attenuation and phase for a "section" of a "filter-type" pipe antenna of the invention.

Taking account of the radiation resistance, the phase shift and attenuation per section are given by the equations $$\sin B = \frac{1}{\sqrt{\frac{1}{2}[(C^2+D^2-1)\mp\sqrt{(C^2+D^2-1)^2+4D^2}]}} \quad (45)$$

$$\sinh A = \frac{1}{\sqrt{\frac{1}{2}[(C^2+D^2-1)\pm\sqrt{(C^2+D^2-1)^2+4D^2}]}} \quad (46)$$

where the negative sign is used outside the pass band and the positive sign inside the pass band for sin B and vice versa for sinh A. As an example, we take the case where $$\frac{\omega l}{V} = \frac{2\omega l_1}{V}$$

or there is 180 degrees phase shift between radiation points at the anti-resonant frequency of the side branch. The value of $Z_0/Z_{01}$ is taken as 20, and the radiation resistance R is taken as 50 $Z_0$. Then the phase shift and attenuation per section are as shown in Fig. 19, curves 160 and 162, respectively.

Solving the acoustic case represented by Figs. 15 to 17, inclusive, in a similar manner we find $$\cosh\theta = \left[\cos\frac{\omega l}{V} + \frac{1}{2\omega C_0 Z_0}\left(1-\frac{\omega^2}{\omega_a^2}\right)\sin\frac{\omega l}{V} + \frac{jZ_0}{2R}\left(\sin\frac{\omega l}{V} - \frac{\left(1-\frac{\omega^2}{\omega_a^2}\right)}{\omega C_0 Z_0}\cos^2\frac{\omega l}{2V}\right)\right] \quad (47)$$

where $\omega_a$ is the resonance frequency of the series resonant circuit. Neglecting the radiation resistance, the cut-off frequencies and characteristic impedances are given by $$\tan\frac{\omega_1 l}{2V} = \frac{1}{2\omega_1 C_0 Z_0}\left(1-\frac{\omega_1^2}{\omega_a^2}\right) \quad (48)$$

$$\cos\frac{\omega_2 l}{2V} = -\frac{1}{2\omega_2 C_0 Z_0}\left(1-\frac{\omega_2^2}{\omega_a^2}\right) \quad (49)$$

$$K = Z_0\sqrt{\frac{\sin\frac{\omega l}{V} - \frac{1}{\omega C_0 Z_0}\left(1-\frac{\omega^2}{\omega_a^2}\right)\cos^2\frac{\omega l}{2V}}{\sin\frac{\omega l}{V} + \frac{1}{\omega C_0 Z_0}\left(1-\frac{\omega^2}{\omega_a^2}\right)\sin^2\frac{\omega l}{2V}}} \quad (50)$$

For the case of greatest interest which occurs when the resonant frequency $\omega_a$ occurs at the 180-degree phase shift point, the cut-off frequencies and characteristic impedance at the mid-band frequency are given by $$f_{1,2}^2 = f_a^2\left[1 + \frac{4}{\pi}\omega_a C_0 Z_0 \pm \sqrt{\left(1+\frac{4}{\pi}\omega_a C_0 Z_0\right)^2 - 1}\right] \quad (51)$$

$$K = \frac{Z_0}{\sqrt{1 + \frac{16}{\pi^2}\frac{f_1 f_2}{(f_2-f_1)^2}}} \quad (52)$$

If we let $$C = \cos\frac{\omega l}{V} + \frac{\left(1-\frac{\omega^2}{\omega_a^2}\right)}{2\omega C_0 Z_0}\sin\frac{\omega l}{V} \quad (53)$$

$$D = \frac{Z_0}{2R}\left(\sin\frac{\omega l}{V} - \frac{\left(1-\frac{\omega^2}{\omega_a^2}\right)}{\omega C_0 Z_0}\cos^2\frac{\omega l}{2V}\right) \quad (54)$$

the phase and attenuation characteristics are given by Equations 45 and 46.

The directivity of the electromagnetic radiating prism can be calculated by employing Fig. 4B. To calculate the field strength at a point P situated a distance L measured along the axis from the center of the tube and a distance $x$ perpendicular to it, the field strength at the point P due to the energy radiated from the middle hole is $$E = \frac{E_0 e^{-j\left(\frac{\omega}{V}l_0\right)}}{l_0} \quad (55)$$

where $E_0$ is the field strength near the radiating hole, $l_0$ the distance from the hole to the point P and V the velocity of propagation. The next hole will have a field strength $$E_1 = E_0 e^{-(A+jB)} \quad (56)$$

with respect to the first where A is the attenuation of one section, and B the phase shift. Similarly for the other holes. The sum total of all of the radiations from all the holes will be $$E_T = E_0\left[\frac{e^{-j\left(\frac{\omega}{V}l_0\right)}}{l_0} + \frac{e^{-A-j\left(\frac{\omega}{V}l_1+B\right)}}{l_1} + \frac{e^{+A-j\left(\frac{\omega}{V}l_{-1}-B\right)}}{l_{-1}} + \cdots\right] \quad (57)$$

But $$l_0 = R = \sqrt{L^2+x^2},\ l_1 = \sqrt{(L-l)^2+x^2},\ l_{-1} = \sqrt{(L+l)^2+x^2},\ etc.$$

where $l$ is the distance between radiation holes.

Now if $R$ is large compared to half the length of the radiating prism, we can write $$l_1 = R\sqrt{1-\frac{(2Ll-l^2)}{R^2}} \doteq R\left(1-\frac{Ll}{R^2}\right) = R - l\cos\theta \quad (58)$$

where $\theta$ is the angle between the axis of the radiation and a line from the center of the radiator to the point P. Similarly, $$l_{\left(\frac{n-1}{2}\right)} = R\left[1-\frac{(n-1)lL}{2R^2}\right] = R + \left(\frac{n-1}{2}\right)l\cos\theta \quad (59)$$

$$l_{-\left(\frac{n-1}{2}\right)} = R\left[1+\frac{(n-1)lL}{2R^2}\right] = R + \left(\frac{n-1}{2}\right)l\cos\theta \quad (60)$$

Furthermore, since $$\frac{n}{2}l << R$$

we can write for the first few powers $$\frac{1}{l_{\left(\frac{n-1}{2}\right)}} = \frac{e^{-\left(\frac{n-1}{2}\frac{l}{R}\right)\cos\theta}}{R} \quad (61)$$

$$\frac{1}{l_{-\left(\frac{n-1}{2}\right)}} = \frac{e^{\left(\frac{n-1}{2}\frac{l}{R}\cos\theta\right)}}{R} \quad (62)$$

The terms of Equation 57 then take the form $$E_T = \frac{E_0}{R}\left[e^{\left(\frac{n-1}{2}\right)(\alpha+j\beta)} + \ldots + 1 + \ldots e^{-\left(\frac{n-1}{2}\right)(\alpha+j\beta)}\right] \quad (63)$$

which is a geometrical progression having the sum $$E_T = \frac{E_0}{R}e^{\left(\frac{n-1}{2}\right)(\alpha+j\beta)}\left[\frac{1-e^{-n(\alpha+j\beta)}}{1-e^{-(\alpha+j\beta)}}\right] = \frac{E_0}{R}\frac{\sinh\frac{n}{2}(\alpha+j\beta)}{\sinh\frac{(\alpha+j\beta)}{2}} \quad (64)$$

In this equation $$\alpha = A + \frac{l}{R}\cos\theta; \quad \beta = \left(-\frac{\omega l}{V}\cos\theta + B\right) \quad (65)$$

We desire to know the absolute value of this equation since the relative phases are not of importance for this application. Taking the absolute value of Equation 54 we find $$|E_T| = \frac{E_0}{R}\sqrt{\frac{\sin^2\frac{n}{2}\beta + \sinh^2\frac{n}{2}\alpha}{\sin^2\frac{\beta}{2} + \sinh^2\frac{\alpha}{2}}} \quad (66)$$

From an inspection of the equation we see that the maximum radiation will occur when $B=0$ or $2\pi$. For these values $$\cos\theta = \frac{B-(2m\pi)}{\frac{\omega l}{V}} \text{ where } m=0 \text{ or } 1 \quad (67)$$

Hence, at the lower frequency cut-off the beam will be radiated perpendicularly to the axis. As the frequency increases, the angle $\theta$ decreases until at mid-band with $B=\pi$, the radiation will occur along the axis of the tube in the direction of propagation. Simultaneously, it will also occur in the opposite direction since $\pi=2\pi/\pi=-1$. As the frequency increases from mid-band to the upper cut-off, the beam will go from $\theta=180$ degrees to $\theta=90$ degrees. If we select certain angles, say $\theta=45$ degrees and 5 degrees, it is a matter of interest to find out the frequency spectrum received at that angle. By inserting the value of B versus frequency given by curve 160 of Fig. 19, and assuming that half the power input is radiated, the frequency spectrum received is shown by curve 164 of Fig. 20 for a radiator 25 wave-lengths long. The solid curve 164 shows the decibels down from the maximum received signal, as a function of frequency. The solid curve is for $\theta=45$ degrees. As can be seen, the maximum is rather broad but the first minimums are very narrow and can be accurately placed. If, for example, the spectrum received is examined by using a frequency modulated oscillator and a narrow band filter, the two minima on either side of the principal maximum can be accurately located and the angle from the radiator determined within a small fraction of a degree.

Figure 14:
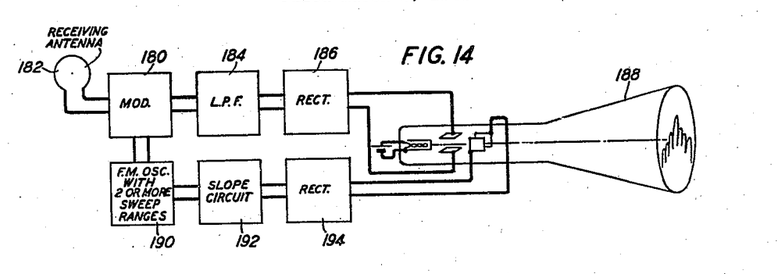
Fig. 14 illustrates in diagrammatic form a receiving system which may be used in direction-indicating systems of the invention.

Such a receiving system is shown in Fig. 14. It consists of a frequency modulated oscillator 190 whose frequency range is sufficient to cover the maximum and at least the two minima on either side. The control of this oscillator is geared to one pair of deflecting plates of a cathode ray tube 188 through a slope circuit 192 and rectifier 194, so that the spot sweeps across the tube in accordance with the frequency of the oscillator. Oscillator 190 also modulates the output of the antenna 182 in modulator 180 and the resulting modulation is sent through a low-pass filter 184 whose frequency range is smaller than the frequency breadth of the minima of the curve. The output is rectified in rectifier 186 and put on the other pair of deflecting plates of the cathode ray tube. The ray of the tube then will trace a pattern of the frequency versus amplitude curve of the spectrum received. By varying the range of the frequency modulated oscillator 190, the accuracy of the frequency determination can be varied. A wide range is usually used in locating the maximum and then the range is narrowed to more accurately locate the two minima.

Figure 20:
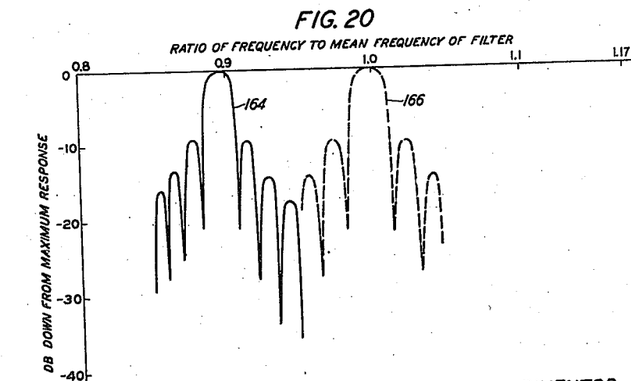
Fig. 20 shows curves of frequency versus amplitude of reception for beams impinging at different angles upon a pipe antenna.

Increasing the number of wave-lengths in the over-all length of the radiator will cut down the frequency separation between the two minima in proportion to the number of wave-lengths. However, it appears unnecessary to go to a radiator larger than 25 wave-lengths for this purpose since by using the minima the angle can be located with great accuracy. In fact, a radiator shorter than 25 wave-lengths can be used and hence it appears entirely feasible to use such a system with wave-lengths as long as 50 centimeters. The dash curve 166 of Fig. 20 shows that when the angle between the axis of the radiator and the line of direction of the signal becomes small the accuracy of location also becomes smaller.

In order to determine the dimensions of the acoustic prism of Fig. 16, it is necessary to calculate the value of the series mechanical impedance of the clamped diaphragm which is acted upon on both sides by a plane wave. The following method may be followed to determine this impedance.

The equations of motion of a diaphragm in simple harmonic motion are given by Rayleigh's Theory of Sound, vol. I, chapter X, Equation 8, in the form $$a^2\nabla^4 W - \omega^2 W - \frac{(p_1-p_2)}{2\rho h} = 0 \quad (68)$$

where $$a^2 = \frac{Eh^2}{2\rho(1-\sigma^2)}$$

$E=$ Young's modulus of the material, $2h$ is the thickness of the plate, $\sigma$ is Poisson's ratio, $\rho$ is the density, $\omega$ is $2\pi$ times the frequency $f$, and $(p_1-p_2)$ is the resultant of the pressures applied to the two sides of the diaphragm. In this case we assume plane waves on the two sides so that $p=p_1-p_2$ will not vary across the diaphragm. For this case, motion can only occur in one direction, the $x$, so that $$\nabla^2 = \frac{\partial 4}{\partial x 4}$$

Hence the equation to solve becomes $$a^2 \frac{\partial^4 W}{\partial x^4} - \omega^2 W - \frac{(p)}{2\rho h} = 0 \quad (69)$$

$W$ in this equation is the displacement perpendicular to the plane of the diaphragm.

This equation is solved by letting $$W = A \cosh \alpha x + B \sinh \alpha x + C \cos \beta x + D \sin \beta x + K \quad (70)$$

Upon differentiating this equation and substituting in Equation 69 we find that Equation 70 is a solution provided $$a^2\alpha^4 - \omega^2 = 0; \quad a^2\beta^4 - \omega^2 = 0; \quad K = -\frac{p}{2\rho h \omega^2}$$

This gives $$\alpha = \sqrt{\frac{\omega}{a}}; \quad \beta = \sqrt{\frac{\omega}{a}} \quad (71)$$

and hence $$W = A \cosh \sqrt{\frac{\omega}{a}}x + B \sinh \sqrt{\frac{\omega}{a}}x + C \cos \sqrt{\frac{\omega}{a}}x + D \sin \sqrt{\frac{\omega}{a}}x - \frac{p}{2\rho h \omega^2} \quad (72)$$

To evaluate the constants A, B, C and D we let $$W = 0 \text{ at } X = 0 \text{ and } X = l \quad (73)$$

$$\frac{\partial W}{\partial x} = 0 \text{ at } X = 0 \text{ and } X = l$$

which, though they are the conditions for a bar clamped at both ends, are valid for a diaphragm for most practical cases. Introducing these conditions we have $$A = \frac{p}{2\rho h \omega^2} \left[ \frac{\left(1+\cosh\sqrt{\frac{\omega}{a}}l\right)\left(1-\cos\sqrt{\frac{\omega}{a}}l\right) - \sin\sqrt{\frac{\omega}{a}}l \sinh\sqrt{\frac{\omega}{a}}l}{2\left(1-\cos\sqrt{\frac{\omega}{a}}l \cosh\sqrt{\frac{\omega}{a}}l\right)} \right] \quad (74)$$

$$B = \frac{p}{2\rho h \omega^2} \left[ \frac{\sin\sqrt{\frac{\omega}{a}}l\left(\cosh\sqrt{\frac{\omega}{a}}l - 1\right) + \sinh\sqrt{\frac{\omega}{a}}l\left(\cos\sqrt{\frac{\omega}{a}}l - 1\right)}{2\left(1-\cos\sqrt{\frac{\omega}{a}}l \cosh\sqrt{\frac{\omega}{a}}l\right)} \right] \quad (75)$$

$$C = \frac{p}{2\rho h \omega^2} \left[ \frac{\left(1+\cos\sqrt{\frac{\omega}{a}}l\right)\left(1-\cosh\sqrt{\frac{\omega}{a}}l\right) + \sin\sqrt{\frac{\omega}{a}}l \sinh\sqrt{\frac{\omega}{a}}l}{2\left(1-\cos\sqrt{\frac{\omega}{a}}l \cosh\sqrt{\frac{\omega}{a}}l\right)} \right] \quad (76)$$

$$D = -B = \frac{p}{2\rho h \omega^2} \left[ \frac{\sin\sqrt{\frac{\omega}{a}}l\left(1-\cosh\sqrt{\frac{\omega}{a}}l\right) + \sinh\sqrt{\frac{\omega}{a}}l\left(1-\cos\sqrt{\frac{\omega}{a}}l\right)}{2\left(1-\cos\sqrt{\frac{\omega}{a}}l \cosh\sqrt{\frac{\omega}{a}}l\right)} \right] \quad (77)$$

Introducing these values into the expression for $W$ we obtain $$W = \left(\frac{p}{2\rho h \omega^2}\right) \left[ \frac{2\left[\cosh\sqrt{\frac{\omega}{a}}\frac{l}{2} \sin\sqrt{\frac{\omega}{a}}\frac{l}{2} - \sinh\sqrt{\frac{\omega}{a}}\frac{l}{2} \cos\sqrt{\frac{\omega}{a}}\frac{l}{2}\right] \times \left[\sin\sqrt{\frac{\omega}{a}}\frac{l}{2} \cosh\sqrt{\frac{\omega}{a}}x + \sinh\sqrt{\frac{\omega}{a}}\frac{l}{2} \cos\sqrt{\frac{\omega}{a}}x\right]}{1 - \cos\sqrt{\frac{\omega}{a}}l \cosh\sqrt{\frac{\omega}{a}}l} - 1 \right] \quad (78)$$

We are interested in the average displacement over the surface which can be obtained by integrating $W$ with respect to $X$ and dividing by the interval $l$. This gives $$W = \frac{p}{2\rho h \omega^2} \left[ \frac{2\left[\cosh\sqrt{\frac{\omega}{a}}\frac{l}{2} \sin\sqrt{\frac{\omega}{a}}\frac{l}{2} - \sinh\sqrt{\frac{\omega}{a}}\frac{l}{2} \cos\sqrt{\frac{\omega}{a}}\frac{l}{2}\right] \times \left[\sin\sqrt{\frac{\omega}{a}}\frac{l}{2} \sinh\sqrt{\frac{\omega}{a}}l + \sinh\sqrt{\frac{\omega}{a}}\frac{l}{2} \sin\sqrt{\frac{\omega}{a}}l\right]}{\left(1-\cos\sqrt{\frac{\omega}{a}}l \cosh\sqrt{\frac{\omega}{a}}l\right)\left(\sqrt{\frac{\omega}{a}}l\right)} - 1 \right] \quad (79)$$

Now the series impedance introduced by the clamped diaphragm is given by $$p_1 = \dot{W}Z + p_2 \text{ or } Z = \frac{(p_1-p_2)}{\dot{W}} = \frac{p}{\dot{W}} \quad (80)$$

where $\dot{W}$ is the velocity, which for simple harmonic motion is given by $\dot{W} = j\omega W$. We have then that the series impedance introduced by the diaphragm is $$Z = \frac{-j2\rho h \omega \left[\left(1-\cos\sqrt{\frac{\omega}{a}}l \cosh\sqrt{\frac{\omega}{a}}l\right)\sqrt{\frac{\omega}{a}}l\right]}{\left[2\left[\cosh\sqrt{\frac{\omega}{a}}\frac{l}{2}\sin\sqrt{\frac{\omega}{a}}\frac{l}{2} - \sinh\sqrt{\frac{\omega}{a}}\frac{l}{2}\cos\sqrt{\frac{\omega}{a}}\frac{l}{2}\right] \times \left[\sin\sqrt{\frac{\omega}{a}}\frac{l}{2}\sinh\sqrt{\frac{\omega}{a}}l + \sinh\sqrt{\frac{\omega}{a}}\frac{l}{2}\sin\sqrt{\frac{\omega}{a}}l\right] - \left(1-\cos\sqrt{\frac{\omega}{a}}l \cosh\sqrt{\frac{\omega}{a}}l\right)\sqrt{\frac{\omega}{a}}l\right]} \quad (81)$$

We note that at the resonant frequency of the diaphragm, the impedance Z becomes zero as it should. The first resonant frequency is obtained when $$\sqrt{\frac{\omega_R}{a}}l = 4.73004 \text{ or } \omega_R = \frac{(4.73004)^2 a}{l^2} \quad (82)$$

To obtain the impedance of the clamped diaphragm near the resonant frequency we let $\omega = (\omega_R + \Delta)$, then $\sqrt{\frac{\omega}{a}}l = \sqrt{\frac{\omega_R\left(1+\frac{\Delta}{\omega_R}\right)}{a}}l =$ $$\sqrt{\frac{\omega_R l}{a}}\left(1+\frac{\Delta}{2\omega_R}\right) = 4.73004\left(1+\frac{\Delta}{2\omega_R}\right) \quad (83)$$

Introducing this value in Equation 81 and expanding by means of the multiple angle formulae we find to the first power of $\Delta$ $$Z = \frac{-j25h\omega_R(\cosh m \sin m - \cos m \sinh m)\frac{m^2\Delta}{2\omega_R}}{2\left(\cosh \frac{m}{2} \sin \frac{m}{2} - \sinh \frac{m}{2} \cos \frac{m}{2}\right)\left(\sin \frac{m}{2} \sinh m + \sinh \frac{m}{2} \sin m\right)} \quad (84)$$

where $m = 4.73004$. Introducing the numerical values we find.

$$Z = j(2\rho h\omega_R)\left(\frac{1.076\Delta}{\omega_R}\right) = j(1.076)(2\rho h)\Delta \quad (85)$$

This impedance corresponds to the impedance of a series resonant circuit in the neighborhood of the resonant frequency, which is $$Z = j\omega L_0 - \frac{j}{\omega C_0} = j\omega L_0\left[1 - \frac{1}{\omega^2 L_0 C_0}\right] = j\omega L_0\left[1 - \frac{\omega_R^2}{\omega^2}\right] \quad (86)$$

For small frequency differences from $\omega_R$, this becomes $$Z = j\omega_R L_0\left(\frac{2D}{\omega_R}\right) = j2\Delta L_0 \quad (87)$$

Comparing this with Equation 85 we find a value for the equivalent inductance equal to $$L_0 = .538 (2\rho h) = .538 \rho l_t \quad (88)$$

where $l_t$ is in the thickness of the piece. The equivalent motional mass then is slightly over half the static mass. The compliance can be calculated from the formula $$C_0 = \frac{1}{\omega_R^2 L} = \frac{1}{\frac{(4.73)^4 a^2}{l^4} \times .538 \rho l_t} = \frac{l^4(1-\sigma^2)}{(4.73)^2 l_t^3 E} \quad (89)$$

If now we introduce the filter equations given above, we find from Equation 51 that $$C_0 = \frac{(f_2-f_1)^2}{16(f_1 f_2)^{3/2} Z_0} \quad (90)$$

Introducing this into Equation 89 and determining the frequency by Equation 82 the expressions for the length $l$ and the thickness $l_t$ become $$l = \frac{.881}{(f_2-f_1)}\sqrt{Z_0\sqrt{\frac{E}{\rho(1-\sigma^2)}}}; \quad l_t = \frac{.755 Z_0 f_R}{\rho(f_2-f_1)^2} \quad (91)$$

As a further example, consider a prism of the general type illustrated in Fig. 16 for passing a 1-megacycle band with a lower cut-off at 500 kilocycles and an upper one at 1500 kilocycles. Assume that the "clamped diaphragms" (i. e., the cup bottoms) are made from aluminum which has the constants $$\rho = 2.68; \quad E = 7.01 \times 10^{11}; \quad \sigma = .37 \quad (92)$$

and that the prism is immersed in water having a $Z_0$ of $1.5 \times 10^5$ ohms per square centimeter. Then introducing these values and noting that $f_R = \sqrt{f_1 f_2} = 866$ kilocycles, we find that $$l_t = .03645 \text{ centimeter} = 14.3 \text{ mils};$$
$$l = .272 \text{ centimeter} = 107 \text{ mils} \quad (93)$$

At the resonance frequency $f_R$ the water column should be a half wave-length so that the depth of the cavity in each cup should be $$l_s = .0865 \text{ centimeter} = 34 \text{ mils} \quad (94)$$

The characteristic impedance of this prism is given by Equation 52

$$K = \frac{1.5 \times 10^5}{1 + \frac{16}{\pi^2}\frac{f_1 f_2}{(f_2-f_1)^2}} = 1.01 \times 10^5 \quad (95)$$

This is nearly the same as water and can easily be matched by the driving or driven crystal. Should air or some other fluid medium fill and surround the radiator a different characteristic impedance ($Z_0$) corresponding to the particular medium, would of course be employed in the above calculations.

Figure 18:
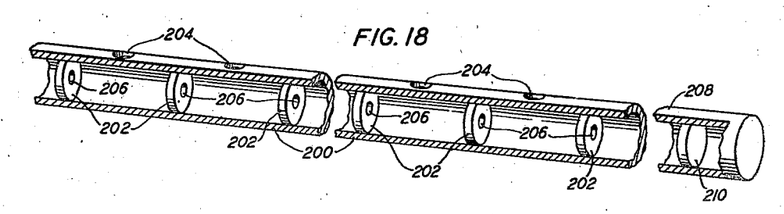
Fig. 18 shows in longitudinal cross-section a wave-guide, band-pass filter-type pipe antenna of the invention.

A further structure exemplifying the application of the principles of the invention is shown in Fig. 18 where pipe of conducting material 200 is employed as a wave-guide in the order of 10 to 50 or more wave-lengths long depending upon the degree of directivity desired as explained above for similar structures. This wave-guide has been converted, in accordance with principles known in the art, into a band-pass filter at ultra-high frequencies by placing crosswise therein discs 202, in which are small central orifices 206, at intervals of slightly less than one-half wave-length of the shortest wave to be radiated. Energy is radiated from an orifice 204 centrally located in each section of the filter thu formed and the arrangement is obviously a fur ther specific embodiment of a prism employin the general principles of the invention. Th end section 208, as for the other prisms abov described, contains an energy absorbing mem ber 210 to prevent reflection of energy from th far end of the structure.

The above-discussed structures are illustra tive of the principles of the invention. It is o vious that a large number of other arrangemen within the spirit and scope of the invention w readily occur to those skilled in the art and th no attempt has here been made to exhaust su possibilities. The scope of the invention is c fined in the following claims.

What is claimed is:

1. In a radio directional system a radiator co prising a coaxial line, the length of the line ceeding ten times the wave-length of the long wave to be radiated, the outer conductor of s line having a row of small apertures along side thereof, the diameter of said apertures ing small with respect to the diameter of the axial line, the apertures being regularly spa with respect to each other, the distance betw adjacent apertures being less than half the w length of the shortest wave to be radiated, number of apertures exceeding twenty, an plurality of auxiliary sections of coaxial line, one of said auxiliary sections being shunted across the line opposite each aperture, the said plurality of auxiliary sections of coaxial line, each being in length one-quarter wave-length of the median wave to be radiated and being short-circuited at its free end.

2. In a system for directively emitting or receiving wave energy of a plurality of frequencies, energy of each of said frequencies to be radiated or received at a particular different angle, a wave filter having at least twenty sections, the transmitting region of said filter including the frequencies to be emitted by said system, a terminal for introducing or abstracting the energy to be radiated or received at one end of said filter, means for radiating or receiving a portion of said energy from corresponding points in each section of said filter and means for absorbing substantially all energy reaching the other end of said filter.

3. The arrangement of claim 2 the plurality of radiating means being proportional to emit equal portions of energy from the several sections of said wave filter.

4. In a radio directional system, a multisection wave filter comprising a long coaxial line shunted at regular intervals by short auxiliary sections of coaxial line the first-stated line having a small orifice at each of said regular intervals for radiating and absorbing a small amount of radio energy.

5. An electromagnetic radiator comprising a tubular member of conducting material its length exceeding ten times its internal diameter, a plurality of diaphragms having small orifices therein, said diaphragms being spaced at regular intervals within said tubular member, said tubular member having a plurality of orifices spaced midway between successive diaphragms, the tubular member and diaphragms being proportioned and arranged to constitute a band-pass wave-guide filter and said orifices in said tubular member being proportioned to radiate substantially equal quantities of energy.

6. The radiator of claim 5 and means at the far end thereof for absorbing energy which reaches that end.

7. A perforated pipe antenna for electromagnetic wave energy comprising a coaxial line, its length being in excess of twenty times the internal diameter of its outer conductor, said outer conductor being free from external obstructions and having therein a row of holes exceeding twenty in number, the diameter of the holes being small in proportion to the diameter of the outer conductor, the holes being regularly spaced in alignment along a side of said outer conductor, the interval between holes being less than one-half wave-length of the energy to be employed, a stub conductor concentrically positioned with respect to each hole, said stub conductors being connected to and supported by the inner conductor of said coaxial line, the length of said stub conductors being not greater than the distance between the respective outer surfaces of the inner and outer conductors of said coaxial line.

8. The antenna of claim 7, one end of said coaxial line being terminated in a resistance substantially equal to the characteristic impedance of the line.

9. In a radio system for directively radiating and receiving a band or spectrum of frequencies, each frequency of said spectrum being radiated or received with greatest amplitude with respect to a particular direction, the direction of maximum amplitude being different for each frequency of said spectrum, a radiating and receiving device comprising a substantially uniform radio transmission line, the length of said line being great with respect to the longest wave-length of said system, said transmission line being enclosed within an outermost member of conductive material, said outermost member comprising solely a tubular member of uniform cross-sectional area throughout its length, said member having therein a plurality of holes regularly spaced in a straight line extending substantially the entire length of said member, all dimensions of said holes being small with respect to one-quarter of the shortest wave-length of said system, the intervals between holes being between one-quarter and one-half of said shortest wave-length whereby each frequency of said spectrum will be radiated or received by said device with greatest amplitude with respect to a particular direction, the direction being different for each frequency within said spectrum.

10. The device of claim 9 the transmission line thereof being a wave-guide.

11. The device of claim 9 the transmission line thereof being a coaxial line.

12. The device of claim 9 and a terminating impedance connected to one end of said device, the said terminating impedance being substantially equal to the characteristic impedance of said device whereby reflection from the terminated end of said device is substantially eliminated.

WARREN P. MASON.